(12) United States Patent
Li

(10) Patent No.: US 10,334,153 B2
(45) Date of Patent: Jun. 25, 2019

(54) IMAGE PREVIEW METHOD, APPARATUS AND TERMINAL

(71) Applicant: Hisense Mobile Communications Technology Co., Ltd., Qingdao, Shandong (CN)

(72) Inventor: Bing Li, Shandong (CN)

(73) Assignee: Hisense Mobile Communications Technology Co., Ltd., Qingdao, Shandong (CN)

( * ) Notice: Subject to any disclaimer, the term of this patent is extended or adjusted under 35 U.S.C. 154(b) by 0 days.

(21) Appl. No.: 15/941,773

(22) Filed: Mar. 30, 2018

(65) Prior Publication Data

US 2018/0227478 A1 Aug. 9, 2018

Related U.S. Application Data

(63) Continuation of application No. PCT/CN2015/089066, filed on Sep. 7, 2015.

(30) Foreign Application Priority Data

Jul. 24, 2015 (CN) .......................... 2015 1 0443350

(51) Int. Cl.
*H04N 5/222* (2006.01)
*H04N 5/232* (2006.01)
(Continued)

(52) U.S. Cl.
CPC ....... *H04N 5/23212* (2013.01); *H04N 5/2226* (2013.01); *H04N 5/2258* (2013.01);
(Continued)

(58) Field of Classification Search
CPC ......... H04N 5/23212; H04N 5/232121; H04N 5/2258; H04N 5/23229; H04N 5/272;
(Continued)

(56) References Cited

U.S. PATENT DOCUMENTS 5,638,342 A 6/1997 Kartsotis et al.
7,817,187 B2 * 10/2010 Silsby .................. G11B 31/006
348/208.6

(Continued)

FOREIGN PATENT DOCUMENTS

CN 201431031 Y 3/2010
CN 102566403 A 7/2012
(Continued)

OTHER PUBLICATIONS

First Office Action for Chinese Patent Application No. CN201510631135.2 dated Jun. 7, 2017; 12 pages.
(Continued)

*Primary Examiner* — Ngoc Yen T Vu
(74) *Attorney, Agent, or Firm* — Brinks Gilson & Lione

(57) ABSTRACT

An image preview method, apparatus, and terminal are disclosed to provide a technical solution in which a background blurring effect with respect to a current scene can be previewed in real time. A terminal device synchronously obtains preview images of a current scene from different angles in a dual-camera photographing preview mode by using a dual-camera module, calculates, in the preview images based on a phase difference generated by a distance and an angle of the dual-camera module, a depth of field of each pixel unit included in a preview image, obtains a foreground depth of field of a preset target area in the preview image, and determines, in the same preview image, an area including all pixel units having a depth of field beyond a range as a background area. The terminal device also performs blurring processing on the background area by using a preset blur coefficient, and outputs an image including the target area and a blurring-processed background area as a real-time preview image of the current scene.

18 Claims, 5 Drawing Sheets

(51) Int. Cl.
*H04N 5/262* (2006.01)
*H04N 5/272* (2006.01)
*H04N 5/225* (2006.01)
*H04N 13/00* (2018.01)
*H04N 5/228* (2006.01)

(52) U.S. Cl.
CPC ..... *H04N 5/23229* (2013.01); *H04N 5/23293* (2013.01); *H04N 5/2621* (2013.01); *H04N 5/272* (2013.01); *H04N 13/00* (2013.01); *H04N 5/23245* (2013.01); *H04N 5/23251* (2013.01); *H04N 5/232935* (2018.08)

(58) Field of Classification Search
CPC .. H04N 5/2226; H04N 5/2621; H04N 5/2625; H04N 5/23293; H04N 5/232935; H04N 5/23251; H04N 13/00; H04N 2013/0081
See application file for complete search history.

(56) References Cited

U.S. PATENT DOCUMENTS

| | | | | |
|---|---|---|---|---|
| 8,780,258 | B2 * | 7/2014 | Lee | G06T 5/002 |
| | | | | 348/345 |
| 9,142,010 | B2 * | 9/2015 | Watts | G06T 5/006 |
| 9,325,968 | B2 * | 4/2016 | Baldwin | H04N 5/262 |
| 9,436,979 | B2 * | 9/2016 | Tanaka | G06T 5/004 |
| 9,654,761 | B1 * | 5/2017 | Esteban | G06T 5/003 |
| 9,813,615 | B2 * | 11/2017 | Lee | H04N 5/06 |
| 10,003,785 | B2 * | 6/2018 | Yoon | G06T 5/50 |
| 2015/0185766 | A1 | 7/2015 | Otsuka et al. | |
| 2015/0265214 | A1 | 9/2015 | De Kok et al. | |

FOREIGN PATENT DOCUMENTS

| | | |
|---|---|---|
| CN | 202589516 U | 12/2012 |
| CN | 203465521 U | 3/2014 |
| CN | 103763970 A | 4/2014 |
| CN | 104095622 A | 10/2014 |
| CN | 204192610 U | 3/2015 |
| CN | 104490384 A | 4/2015 |
| CN | 104510456 A | 4/2015 |
| DE | 10139749 A1 | 2/2003 |
| WO | WO 2008/134847 A1 | 11/2008 |
| WO | WO 2010/111788 A1 | 10/2010 |

OTHER PUBLICATIONS

First Search Report for Chinese Patent Application No. CN201510631135.2 dated May 25, 2017; 4 pages.
Second Office Action for Chinese Patent Application No. CN201510631135.2 dated Dec. 7, 2017; 15 pages.
Second Search Report for Chinese Patent Application No. CN201510631135.2 dated Nov. 28, 2017; 3 pages.
International Search Report for International Patent Application No. PCT/CN2016/074593 dated Jul. 5, 2016; 4 pages.
International Preliminary Report on Patentability and Written Opinion of the International Searching Authority for International Patent Application No. PCT/CN2016/074593 dated Apr. 3, 2018; 6 pages.

* cited by examiner

IMAGE PREVIEW METHOD, APPARATUS AND TERMINAL

CROSS-REFERENCE TO RELATED APPLICATION(S)

This application is a continuation of International Patent Application No. PCT/CN2015/089066, filed Sep. 7, 2015, which claims priority to Chinese Patent Application No. 201510443350.X, filed with the Chinese Patent Office on Jul. 24, 2015 and entitled "IMAGE PREVIEW METHOD, APPARATUS AND TERMINAL," the entirety of all of which are incorporated by reference herein.

BACKGROUND

Technical Field

The features described in the present disclosure belongs to the field of digital imaging technologies, and specifically, to an image preview method and apparatus and a terminal.

Related Art

With the development of image technologies, a background blurring technology attracts wide attention. According to the background blurring technology, during image capture, after the focus is aligned to a body, a clear image can be formed in a range encompassing the focus. A distance between the nearest and farthest objects within the range is referred to as a depth of field. After photographing is completed, background blurring processing is implemented by shallowing the depth of field.

Currently, an increasing quantity of terminals (for example, devices such as a tablet computer and a smartphone) are equipped with array cameras (generally, most are rear-facing dual-camera). Images of a same scene are obtained by using an array camera by photographing from different angles. After photographing is completed, the images are synthesized into one image, and a depth of field is shallowed, to achieve background blurring.

However, in the prior art, such background blurring is implemented by post-processing on a photographed image after photographing is completed. Therefore, before photographing is completed, a user cannot preview a background blurring effect with respect to a current scene.

SUMMARY

Embodiments disclosed herein provide an image preview method and apparatus and a terminal, so as to provide a solution in which a background blurring effect with respect to a current scene can be previewed in real time.

An embodiment provides an image preview method, including: synchronously obtaining, by a terminal, preview images of a current scene from different angles in a dual-camera photographing preview mode by using a dual-camera module; calculating, by the terminal in the preview images based on a phase difference generated by a distance and an angle of the dual-camera module, a depth of field of each pixel unit included in a preview image; obtaining, by the terminal, a foreground depth of field Depth of a preset target area in the preview image, and determining, in the same preview image, an area including all pixel units having a depth of field beyond a range [Depth−d,Depth+d] as a background area; and performing blurring processing on the background area by using a preset blur coefficient, where d is a preset threshold; and outputting, by the terminal, an image including the target area and a blurring-processed background area as a real-time preview image of the current scene; where the pixel unit is specifically a pixel or a pixel block including pixels.

Another embodiment further provides an image preview apparatus, including: an obtaining module, configured to synchronously obtain preview images of a current scene from different angles in a dual-camera photographing preview mode by using a dual-camera module; a calculation module, configured to calculate, in the preview images based on a phase difference generated by a distance and an angle of the dual-camera module, a depth of field of each pixel unit included in a preview image; a processing module, configured to obtain a foreground depth of field Depth of a preset target area in the preview image, and determine, in the same preview image, an area including all pixel units having a depth of field beyond a range [Depth−d,Depth+d] as a background area; and perform blurring processing on the background area by using a preset blur coefficient, where d is a preset threshold; and an output module, configured to output an image including the target area and a blurring-processed background area as a real-time preview image of the current scene; where the pixel unit is specifically a pixel or a pixel block including pixels.

Another embodiment further provides a terminal, including: a dual-camera module, configured to synchronously obtain preview images of a current scene from different angles;

a processor, configured to calculate, in the preview images based on a phase difference generated by a distance and an angle of the dual-camera module, a depth of field of each pixel unit included in a preview image; obtain a foreground depth of field Depth of a preset target area in the preview image, and determine, in the same preview image, an area including all pixel units having a depth of field beyond a range [Depth−d,Depth+d] as a background area; perform blurring processing on the background area by using a preset blur coefficient, where d is a preset threshold; and output an image including the target area and a blurring-processed background area as a real-time preview image of the current scene, where the pixel unit is specifically a pixel or a pixel block including pixels; and a display screen, configured to display the real-time preview image output by the processor.

It can be learned from the technical method that, according to the embodiments disclosed herein, a terminal can synchronously obtain preview images of a current scene from different angles in a dual-camera photographing preview mode. The terminal calculates, based on a phase difference generated by a distance and an angle of the dual-camera module, a depth of field of each pixel unit included in either of the two preview images, thereby determining depth of field information of each pixel unit in the preview image of the current scene. Then the terminal obtains a foreground depth of field Depth of a preset target area in the preview image, and determines, in the same preview image, an area including all pixel units having a depth of field beyond a range [Depth−d,Depth+d] as a background area; and performs blurring processing on the background area by using a preset blur coefficient. Finally, the terminal outputs an image including the target area and a blurring-processed background area as a real-time preview image of the current scene. It can be learned that, the disclosed embodiments provide a solution in which a background blurring effect can be known in advance in a preview process, so that a user performs photographing after knowing a background blurring effect in advance, thereby improving the success rate of photographing.

BRIEF DESCRIPTION OF THE DRAWINGS

To describe the technical solutions discussed herein more clearly, the following briefly describes the accompanying drawings for describing the embodiments. Apparently, the accompanying drawings in the following description show some embodiments, and persons of ordinary skill in the art may still derive other drawings from these accompanying drawings without creative efforts.

DETAILED DESCRIPTION

Embodiments may be applied to various types of terminal devices, for example, devices such as a smartphone, a tablet computer, or a notebook computer, and are also applicable to a terminal device having an array camera or a camera complying with a similar principle, for example, a device such as a terminal having an array camera, a dual-camera terminal, or a terminal having a fly-eye camera.

According to the embodiments disclosed herein, a background (that is, a background area) blurring effect can be seen in a scene preview process, and a background blurring degree can be adjusted in real time. A user performs photographing after obtaining a satisfactory blurring effect. Therefore, the success rate and creativeness of photographing are greatly improved.

Figure 1:
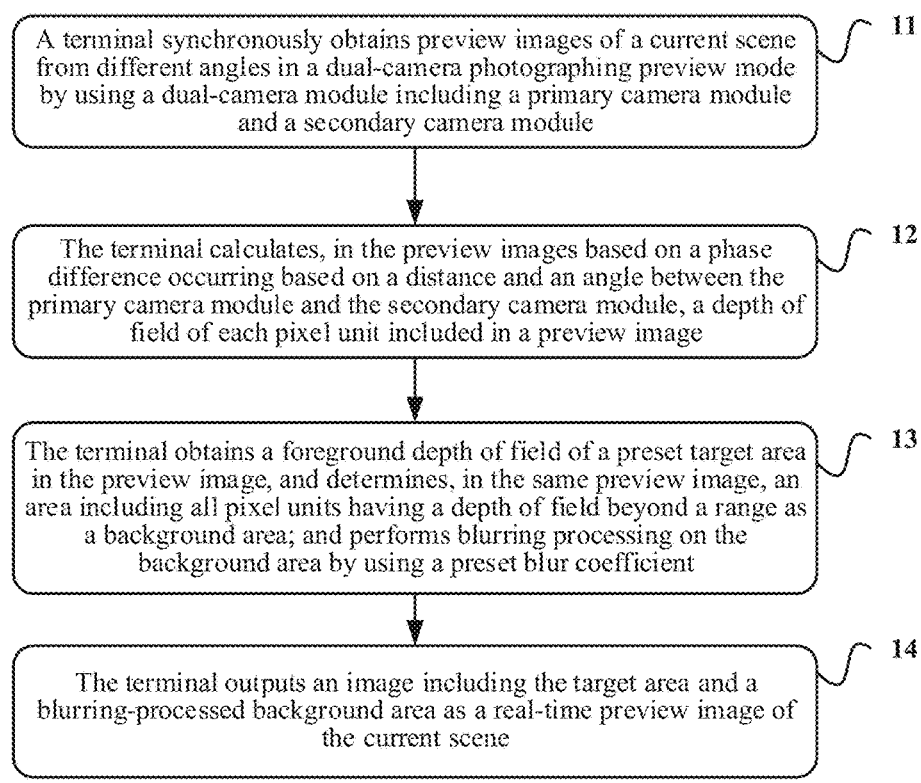
FIG. 1 shows a schematic flowchart of an image preview method according to an embodiment.

FIG. 1 shows a schematic flowchart of an image preview method according to an embodiment. As shown in FIG. 1, the procedure may include:

Step 11: A terminal synchronously obtains preview images of a current scene from different angles in a dual-camera photographing preview mode by using a dual-camera module that includes at least a primary camera module and a secondary camera module.

Step 12: The terminal calculates, in the preview images based on a phase difference occurring due to a distance and an angle between the primary camera module and the secondary camera module, a depth of field of each pixel unit included in a preview image.

Step 13: The terminal obtains a foreground depth of field, Depth, of a preset target area in the preview image, and determines, in the same preview image, an area including all pixel units having a depth of field beyond a range, [Depth−d,Depth+d], as a background area; and performs blurring processing on the background area by using a preset blur coefficient, where d is a preset threshold.

Step 14: The terminal outputs an image including the target area and a blurring-processed background area as a real-time preview image of the current scene.

The pixel unit may be a single pixel or a pixel block including a plurality of pixels.

Optionally, in step 11, the terminal obtains original images of the current scene from two different angles by using the dual-camera module; and separately performs image compression and differential processing on the original images based on a preset zoom ratio and differential coefficient, to obtain preview images of a same size.

Optionally, after step 14, the terminal obtains the original images of the current scene after receiving a photographing instruction; determines, based on the background area determined in the preview image of the current scene, a corresponding background area in an obtained original image, and performs blurring processing on the background area in the original image by using the preset blur coefficient; and outputs an image including a target area in the original image and a blurring-processed background area in the original image as a photographed image.

Optionally, in step 13, the terminal separately calculates a difference between a depth of field of each pixel unit included in the background area and the foreground depth of field, and determines a blur coefficient corresponding to the difference from a pre-generated blur coefficient correspondence; and performs blurring processing on a corresponding pixel unit by using the determined blur coefficient.

Optionally, in step 13, the terminal calculates, according to the following formula 1 for each pixel unit included in the background area, a blur coefficient $m_i$ corresponding to the pixel unit, Formula 1 is $m_i=m\times f(\Delta d)$, where $m_i$ is a blur coefficient of the ith pixel unit, where m is a preset blur coefficient, $f(\Delta d)$ is a monotonically decreasing function or a monotonically increasing function, and $\Delta d=|Depth\_i-Depth|$, Depth_i is a depth of field of the ith pixel unit, and Depth is a foreground depth of field.

Optionally, the target area is set by performing the following steps: the terminal determines, after receiving a focusing instruction, the target area according to a size and coordinates of the target area that are indicated in the focusing instruction; or the terminal determines the target area according to a size and coordinates of the target area that are set by default.

In this embodiment, only a dual-camera mobile phone (referred to as a mobile phone hereinafter for short) is used as an example for description.

The background blurring solution provided in this embodiment may include a preview process and a photographing process. In this embodiment, the mobile phone has a dual-camera apparatus including a primary camera and a secondary camera. A preview image photographed by the primary camera is a primary preview image, and a preview image photographed by the secondary camera is a secondary preview image. Each preview image may be divided into a foreground area and a background area. The foreground area is a target area, which refers to a focused-on area. The target area may include a focused-on area. The background area refers to an area other than the focused-on area. In this embodiment, a parameter of the primary camera may be higher than a parameter of the secondary camera; in this case, the primary image may be selected first for output. Optionally, cameras having a same parameter may be used as the primary camera and the secondary camera; in this case, either of the images may be selected for output.

In this embodiment, because a specific distance or angle exists between the primary camera module and the secondary camera module, there is a specific phase difference between the primary preview image and the secondary preview image. A depth of field of each pixel block and even a depth of field of each pixel can be obtained by using the phase difference, and further, background blurring processing is performed according to a depth of field of the background area and a preset blur coefficient.

The pixel block may be a block including a preset quantity of pixels, for example, a pixel block including 32*32 pixels, a pixel block including 16*16 pixels, or a pixel block including 8*8 pixels.

Figure 2:
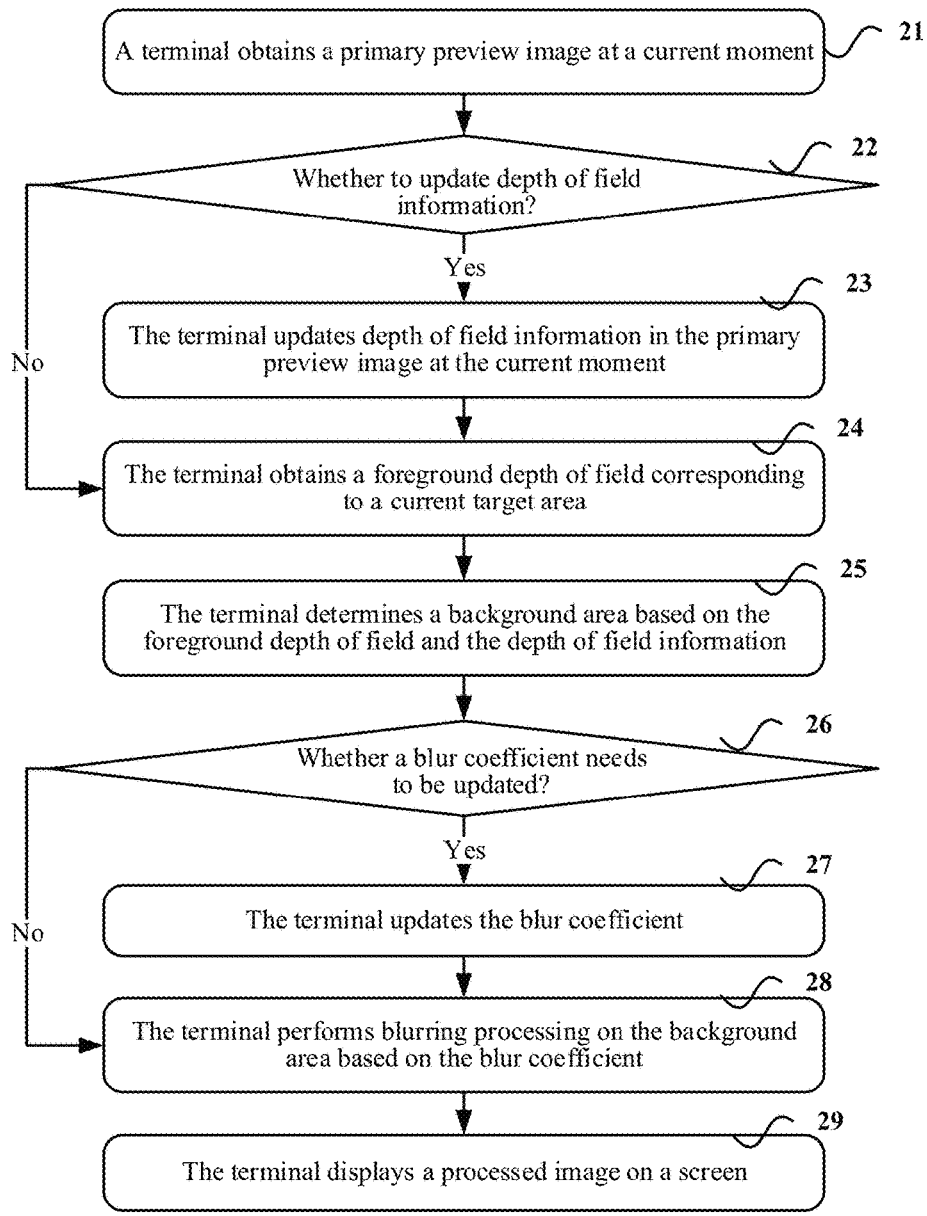
FIG. 2 shows a schematic flowchart of background blurring in a preview process according to an embodiment.

FIG. 2 shows a schematic flowchart of background blurring in a preview process according to an embodiment. As shown in FIG. 2, the procedure may include:

Step 21: A terminal obtains a primary preview image, $I_i$, at a current moment.

During specific implementation, after the terminal starts a photographing preview mode, two cameras of the terminal may synchronously capture original images of a current scene at a preset interval. A preview image photographed by a primary camera is a primary preview image, and a preview image photographed by a secondary camera is a secondary preview image. Further, the terminal separately performs image compression and differential processing on the primary original image and the secondary original image based on a preset zoom ratio and differential coefficient, to obtain a primary preview image, $I_i$, and a secondary preview image, and buffers them. It should be noted herein that, the original images photographed by the two cameras may be of different sizes. Therefore, to facilitate processing, during actual application, compression and differential processing may be performed on the primary original image by using a first preset zoom ratio and differential coefficient, and compression and differential processing are performed on the secondary original image by using a second preset zoom ratio and differential coefficient. To synthesize the secondary image into the primary image, one or both of the images need to be zoomed to be of a same size, that is, the primary image is zoomed to be of a same size as the secondary image or both of the primary image and the secondary image are zoomed to be of a same size. Further, after zoom processing, the images cannot be directly synthesized due to different angles of view, and require differential synthesis processing.

Step 22: The terminal determines whether to update depth of field information in the primary preview image, $I_i$, at the current moment and a primary preview image, $I_{i-1}$, at a previous moment. If yes, step 23 is performed; otherwise, step 24 is performed.

Step 23: The terminal updates depth of field information, D[w,h], in the primary preview image at the current moment.

The depth of field information, D[w,h], may be used as a depth of field map of a current scene, w may represent a length of the depth of field map, h may represent a width of the depth of field map, and w×h is not greater than a pixel size of the entire image. Further, in this embodiment a size of the depth of field information, D[w,h], may be further zoomed according to a zoom ratio of the image.

During specific implementation, in this embodiment the terminal may collect statistics on the depth of field map of the entire image in pixel blocks, or may collect statistics on a depth of field map of the entire image in pixels.

Specifically, the terminal may specifically collect statistics on the depth of field map of the entire image in pixel blocks as follows:

First, the primary preview image and the secondary preview image are divided into pixel blocks according to a same rule. Each pixel block may include $n_a \times n_b$ pixels, where $n_a$ and $n_b$ are positive integers.

Then, because a phase difference exists between the primary camera and the secondary camera of the terminal, the same phase difference also exists between the primary preview image and the secondary preview image. A depth of field of each pixel block may be separately calculated by using the phase difference, and a depth of field of each pixel block in the primary preview image is arranged in sequence and saved as a depth of field map in attribute information of the primary original image corresponding to the primary preview image, or in a secondary file of the primary original image corresponding to the primary preview image. In this way, the terminal may save the depth of field map of the primary original image for blurring processing on the original image during subsequent photographing, or for use in post-processing on the original image.

In this embodiment, the depth of field map may be obtained in the manner implemented above.

Specifically, the terminal may specifically collect statistics on the depth of field map of the entire image in pixels as follows:

Because a phase difference exists between the primary camera and the secondary camera of the terminal, the same phase difference also exists between the primary preview image and the secondary preview image. A depth of field of each pixel may be separately calculated by using the phase difference, and a depth of field of each pixel in the primary preview image is arranged in sequence and saved, as a depth of field map, in attribute information of the primary original image corresponding to the primary preview image, or in a secondary file of the primary original image corresponding to the primary preview image. In this way, the terminal may save the depth of field map of the primary original image for blurring processing on the original image during subsequent photographing, or for use in post-processing on the original image.

In this embodiment, the depth of field map may be obtained in the manner implemented above.

It should be noted that, the depth of field map is a set of depths of field of all areas (that is, pixel blocks) or all pixels in the entire image. This embodiment includes, but is not limited to, the two depth of field map obtaining manners above, and all other manners that can be used to obtain the set of depths of field of all the areas (that is, pixel blocks) or all the pixels in the entire image fall within the protection scope of this application, and are not enumerated herein.

It should be further noted that, in this embodiment the depth of field map may be output in real time when the two cameras work. However, to ensure processing efficiency, during actual application, the depth of field map may be updated once at an interval of 6 to 12 preview frames.

Step 24: The terminal obtains a foreground depth of field, Depth, corresponding to a current target area, Ia.

During specific implementation, the terminal may determine an area currently needing to be focused on as the target area, Ia, and determine an area other than the target area as a background area, Ib, that is, $I_i=Ia+Ib$. Then the terminal may obtain the foreground depth of field, Depth, corresponding to the target area, Ia, from the depth of field map.

It should be noted that, in this embodiment the target area setting manner may be the same as those implemented in the prior art. Generally, the target area may be manually selected by a user, where prior to the manual selection of the user, the terminal may use a default target area as the current target area.

Step 25: The terminal obtains, based on the foreground depth of field, Depth, and the depth of field information, D[w,h], an image area having a depth of field beyond a range, [Depth−d,Depth+d], in the primary preview image, and determines the area as a background area, Ib.

Accordingly, d is a preset threshold and used to indicate a range of a depth of field of a focused-on area. Specifically, if only a specific value is specified as Depth, the focused-on area is limited excessively strictly, resulting in an excessively small fully clear area. Therefore, a range encompassing the specific value is used, making an object in the focused-on area as completely clear as possible, rather than partially clear.

During specific implementation, the terminal may determine an area other than the target area, Ia, as a background area, that is, determine an image area having a depth of field beyond the range, [Depth−d,D+d], as a background area Ib. The background area, Ib, may include areas having different depths of field, that is, the background area, Ib, may include pixel blocks or pixels having different depths of field.

Step 26: The terminal determines whether a blur coefficient, $m_i$, needs to be updated. If yes, step 27 is performed; otherwise, step 28 is performed.

Step 27: The terminal updates the blur coefficient $m_i$.

During specific implementation, in this embodiment areas beyond [Depth−d,Depth+d] have different blur degrees; being closer to Depth (that is, target Depth) of the target area corresponds to a smaller blur degree, while being farther from Depth (that is, target Depth) of the target area corresponds to a larger blur degree.

It should be noted that, in this embodiment, a same blur coefficient may be used for all pixel units included in the background area, and details are not described herein.

Specifically, the terminal may calculate, according to the following formula 1 for each pixel unit included in the background area, a blur coefficient $m_i$ corresponding to the pixel unit. Formula 1 is $m_i = m \times f(\Delta d)$. Herein, $m_i$ is a blur coefficient of the ith pixel unit, m is a preset blur coefficient, $f(\Delta d)$ is a monotonically decreasing function or a monotonically increasing function, and $\Delta d = |Depth\_i − Depth|$, Depth_i is a depth of field of the ith pixel unit, and Depth is the foreground depth of field.

Specifically, in this embodiment the preset value of the blur coefficient may be manually adjusted by the user, or may be set by the terminal to a preset value by default during initialization. When the user manually adjusts the blur coefficient, the terminal may reflect an adjusted effect on a next frame image immediately after adjustment, to achieve real-time preview. Additionally, a display interface of the terminal may be provided with an adjustment button for adjusting the coefficient. The adjustment button may be a virtual key, or may be a physical key or a combination of keys.

Step 28: The terminal performs blurring processing on the background area Ib based on the blur coefficient $m_i$.

During specific implementation, in this embodiment the manner for performing blurring processing on the background area Ib may include various blurring processing manners in the prior art, which are not enumerated herein, and only a mean filtering manner is used as an example for description.

Figure 4A:
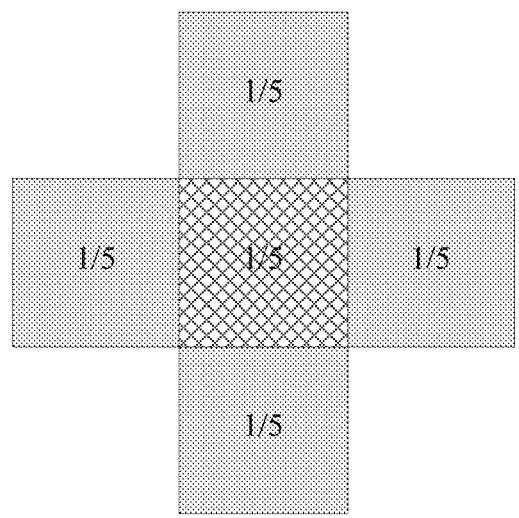
FIG. 4(A) shows a schematic diagram of background blurring processing in a mean filtering f(m) manner according to an embodiment.

Specifically, FIG. 4(A) shows a schematic diagram of background blurring processing in a mean filtering f(m) manner according to an embodiment. FIG. 4(A) shows weights of five pixels, and the five pixels are one center pixel and four adjacent pixels of the center pixel. In this embodiment, a mean filter f(m) may be disposed. That is, a pixel value of each pixel is substituted by a sum of weights of the pixel and its four adjacent pixels.

Referring to FIG. 4(A), when m=0, a weight of the center pixel may be 1.

When m increases, the weight of the center pixel center area gradually decreases, maximally decreasing to ⅕.

A weight allocation rule for the five pixels is as follows: The weight of the center pixel is set to R, a value range of R is [⅕,1], and weights of the other adjacent pixels are all $$\frac{(1-R)}{4}.$$

Therefore, a blurring processing process may be a convolution process: $I'_b = I_b \otimes f(m)$.

Figure 4B:
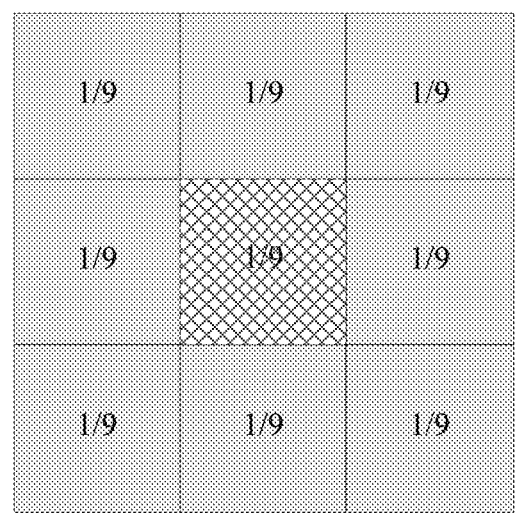
FIG. 4(B) shows a schematic diagram of background blurring processing in a mean filtering F(m) manner according to an embodiment.

Further, if f(m) does not achieve a desired blur effect, a mean filter F(m) of a larger magnitude may be used. FIG. 4(B) shows a schematic diagram of background blurring processing in a mean filtering F(m) manner according to an embodiment. FIG. 4(B) shows weights of nine pixels, and the nine pixels are one center pixel and eight adjacent pixels of the center pixel. That is, a pixel value of each pixel is substituted by a sum of weights of the pixel and its eight adjacent pixels.

Referring to FIG. 4(B), when m=0, a weight of the center pixel may be 1.

When m increases, the weight of the center pixel center area gradually decreases, maximally decreasing to ⅑.

A weight allocation rule for the nine pixels is as follows: The weight of the center pixel is set to R, a value range of R is [⅑,1], and weights of the other adjacent pixels are all $$\frac{(1-R)}{8}.$$

Therefore, a blurring processing process may be a convolution process: $I'b = Ib \otimes F(m)$.

Similarly, if a blur effect is still dissatisfactory, a filter of a larger magnitude may be used for convolution processing.

Step 29: The terminal displays a processed image I' on a screen.

During specific implementation, the terminal outputs an image including the target area Ia and a blurring-processed background area I'b as a real-time preview image I' of the current scene, that is, I'=Ia+I'b.

Figure 3:
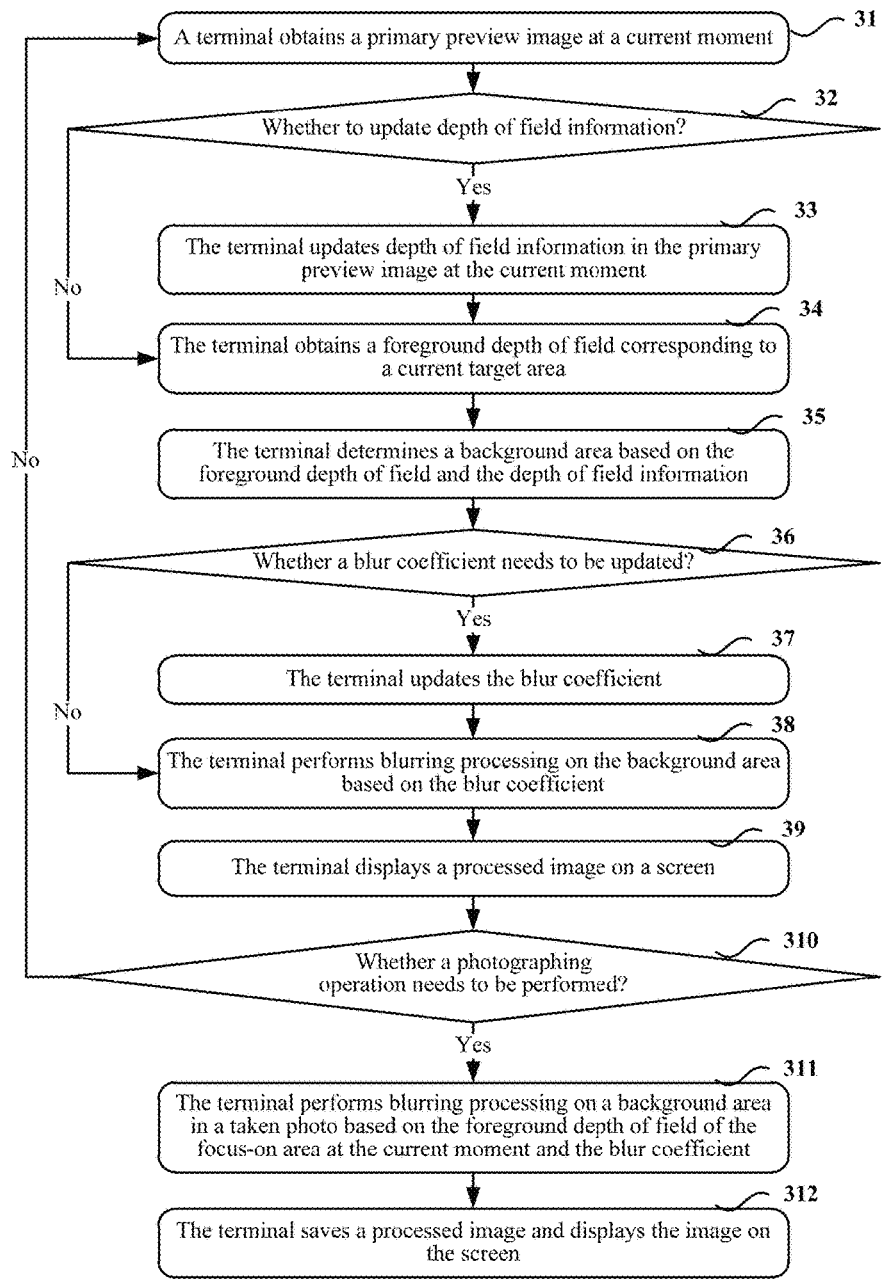
FIG. 3 shows a schematic flowchart of background blurring in a photographing process according to an embodiment.

FIG. 3 shows a schematic flowchart of background blurring in a photographing process according to an embodiment. As shown in FIG. 3, the procedure may include:

step 31 to step 39 are the same as the preview process described in step 21 to step 29, and are not described herein again. After step 39 is performed, the following step 310 is further performed.

Step 310: The terminal determines whether a photographing operation needs to be performed. If yes, step 31 is performed; otherwise, step 31 is performed again.

Step 311: The terminal performs blurring processing on a background area in a taken photo based on the foreground depth of field Depth of the target area at the current moment and the blur coefficient $m_i$.

During specific implementation, in this embodiment, blurring processing may be performed on the background area in the taken photo in the same manner implemented in step 28, which is not described herein again.

Step 312: The terminal saves a processed image and displays the image on the screen.

It can be learned from the technical method that, in this embodiment a terminal can synchronously obtain preview images of a current scene from different angles in a dual-camera photographing preview mode. The terminal calculates, based on a phase difference generated by a distance and an angle of the dual-camera module, a depth of field of each pixel unit included in either of the two preview images, thereby determining depth of field information of each pixel unit in the preview image of the current scene. Then the terminal obtains a foreground depth of field Depth of a preset target area in the preview image, and determines, in the same preview image, an area including all pixel units having a depth of field beyond a range [Depth−d,Depth+d] as a background area; and performs blurring processing on the background area by using a preset blur coefficient. Finally, the terminal outputs an image including the target area and a blurring-processed background area as a real-time preview image of the current scene. It can be learned that, this embodiment provides a solution in which a background blurring effect can be known in advance in a preview process, so that a user performs photographing after knowing a background blurring effect in advance, thereby improving the success rate of photographing.

Figure 5:
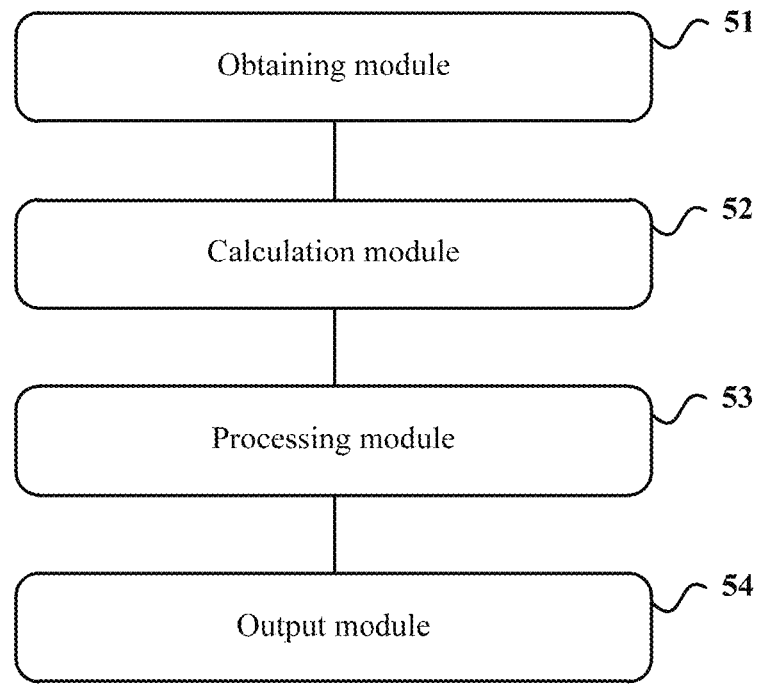
FIG. 5 shows a schematic structural diagram of an image preview apparatus according to an embodiment.

Based on the same technical principle, an embodiment further provides an image preview apparatus. FIG. 5 shows a schematic structural diagram of an image preview apparatus according to an embodiment. As shown in FIG. 5, the apparatus includes:

an obtaining module 51, configured to synchronously obtain preview images of a current scene from different angles in a dual-camera photographing preview mode by using a dual-camera module;

a calculation module 52, configured to calculate, in the preview images based on a phase difference generated by a distance and an angle of the dual-camera module, a depth of field of each pixel unit included in a preview image;

a processing module 53, configured to obtain a foreground depth of field Depth of a preset target area in the preview image, and determine, in the same preview image, an area including all pixel units having a depth of field beyond a range [Depth−d,Depth+d] as a background area; and perform blurring processing on the background area by using a preset blur coefficient, where d is a preset threshold; and an output module 54, configured to output an image including the target area and a blurring-processed background area as a real-time preview image of the current scene;

where the pixel unit is specifically a pixel or a pixel block including pixels.

Optionally, the obtaining module 51 is specifically configured to:

obtain original images of the current scene from two different angles by using the dual-camera module; and separately perform image compression and differential processing on the original images based on a preset zoom ratio and differential coefficient, to obtain preview images of a same size.

Optionally, the apparatus further includes:

a photographing module, configured to: after the real-time preview image is output, obtain the original images of the current scene after a photographing instruction is received; and determine, based on the background area determined in the preview image of the current scene, a corresponding background area in an obtained original image, and perform blurring processing on the background area in the original image by using the preset blur coefficient;

where the output module 54 is further configured to output an image including a target area in the original image and a blurring-processed background area in the original image as a photographed image.

Optionally, the processing module 53 is specifically configured to: separately calculate a difference between a depth of field of each pixel unit included in the background area and the foreground depth of field, and determine a blur coefficient corresponding to the difference from a pre-generated blur coefficient correspondence; and perform blurring processing on a corresponding pixel unit by using the determined blur coefficient.

Optionally, the processing module 53 is specifically configured to: calculate, according to the following formula 1 for each pixel unit included in the background area, a blur coefficient $m_i$ corresponding to the pixel unit. Formula 1 is $m_i = m \times f(\Delta d)$, where $m_i$ is a blur coefficient of the ith pixel unit, where m is a preset blur coefficient; $f(\Delta d)$ is a monotonically decreasing function or a monotonically increasing function; and $\Delta d = |Depth\_i - Depth|$, Depth_i is a depth of field of the ith pixel unit, and Depth is the foreground depth of field.

Optionally, the apparatus further includes:

a focusing module, configured to determine, after a focusing instruction is received, the target area according to a size and coordinates of the target area that are indicated in the focusing instruction; or determine the target area according to a size and coordinates of the target area that are set by default.

Figure 6:
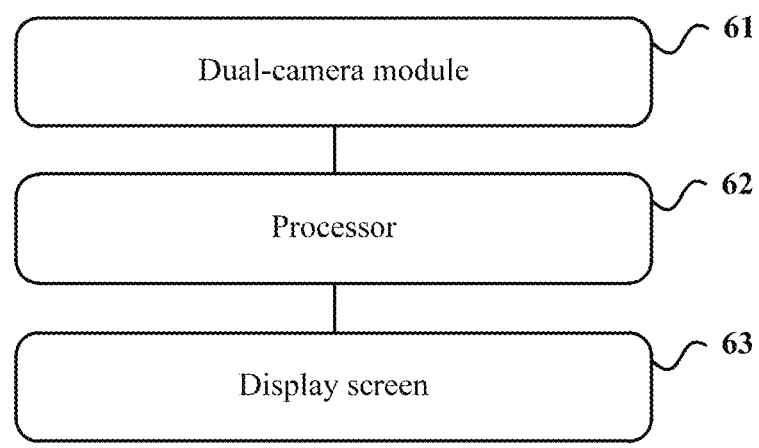
FIG. 6 shows a schematic structural diagram of a terminal according to an embodiment.

Based on the same technical principle, an embodiment further provides a terminal. FIG. 6 shows a schematic structural diagram of a terminal according to an embodiment. As shown in FIG. 6, the terminal includes:

a dual-camera module 61, configured to synchronously obtain preview images of a current scene from different angles;

a processor 62, configured to calculate, in the preview images based on a phase difference generated by a distance and an angle of the dual-camera module, a depth of field of each pixel unit included in a preview image; obtain a foreground depth of field Depth of a preset target area in the preview image, and determine, in the same preview image, an area including all pixel units having a depth of field beyond a range [Depth−d,Depth+d] as a background area; perform blurring processing on the background area by using a preset blur coefficient, where d is a preset threshold; and output an image including the target area and a blurring-processed background area as a real-time preview image of the current scene, where the pixel unit is specifically a pixel or a pixel block including pixels; and a display screen 63, configured to display the real-time preview image output by the processor.

The features of the embodiments disclosed herein are described with reference to the flowcharts and/or block diagrams of the method, the device (system), and the computer program product according to the embodiments. It should be understood that a computer program instruction may be used to implement each process and/or block in the flowcharts and/or block diagrams and combinations of processes and/or blocks in the flowcharts and/or block diagrams. The computer program instructions may be provided to a general-purpose computer, a dedicated computer, an embedded processor or a processor of another programmable data processing device, so that the computer or the processor of another programmable data processing device can execute an instruction to implement functions specified in one or more processes in a flowchart and/or one or more blocks in a block diagram.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

The computer program instructions may also be installed in the computer or another programmable data processing device, such that a series of operation steps are executed on the computer or another programmable device to generate a computer implemented processing, and therefore, the instruction executed in the computer or another programmable device provides steps for implementing functions designated in one or more processes in a flowchart and/or one or more blocks in a block diagram.

Although some preferred embodiments have been described, persons skilled in the art can make changes and modifications to these embodiments once they learn the basic inventive concept. Therefore, the following claims are intended to be construed as to cover the preferred embodiments and all changes and modifications falling within the scope of the embodiments.

A person skilled in the art may make various modifications and variations to the embodiments without departing from the spirit and scope of the present invention. The embodiments are intended to cover these modifications and variations provided that they fall within the scope of protection defined by the following claims and their equivalent technologies.

What is claimed is:

1. An image preview method, the method comprising:
   synchronously obtaining, by a terminal operating in a dual-camera photographing preview mode, preview images of a current scene captured from different angles by a primary camera module and a secondary camera module;
   calculating, by the terminal, a depth of field of each pixel unit comprised in the preview images based on a phase difference occurring based on a distance or an angle between the primary camera module and the secondary camera module;
   obtaining, by the terminal, a foreground depth of field of a preset target area in a preview image included in the preview images;
   determining, in the preview image, an area comprising all pixel units having a depth of field beyond a range as a background area;
   performing blurring processing on the background area by using a preset blur coefficient;
   outputting, by the terminal, an image comprising the preset target area and a blurring-processed background area as a real-time preview image of the current scene; and
   wherein the pixel unit is one of a pixel or a pixel block comprising a plurality of pixels.

2. The method according to claim 1, wherein synchronously obtaining, by the terminal, preview images of the current scene comprises:
   synchronously obtaining, by the terminal, original images of the current scene from two different angles captured by the primary camera module and secondary camera module respectively; and
   performing image compression and differential processing on the original images based on a preset zoom ratio and differential coefficient, to obtain the preview images of a same size.

3. The method according to claim 2, wherein after outputting the real-time preview image, further comprises:
   obtaining, by the terminal, the original images of the current scene upon receiving an instruction for taking a photograph;
   determining, by the terminal based on the background area determined in the preview image, a corresponding background area in an obtained original image;
   performing blurring processing on the background area in the original image by using the preset blur coefficient; and
   outputting, by the terminal, a modified image comprising a target area in the original image and the background area in the original image which has been processed by the blurring processing as a photographed image.

4. The method according to claim 1, wherein performing the blurring processing on the background area comprises:
   calculating a difference between a depth of field and a foreground depth of field of each pixel unit comprised in the background area, and determining a blur coefficient corresponding to the difference from a pre-defined blur coefficient correspondence; and
   performing blurring processing on a corresponding pixel unit by using the determined blur coefficient.

5. The method according to claim 4, wherein determining the blur coefficient corresponding to the difference comprises:
   calculating, according to a formula, a blur coefficient for each pixel unit comprised in the background area, wherein the formula is $m_i = m \times f(\Delta d)$; and
   wherein, $m_i$ is the blur coefficient of an ith pixel unit, m is a preset blur coefficient, $f(\Delta d)$ is a monotonically decreasing function or a monotonically increasing function, $\Delta d = |Depth\_i - Depth|$, Depth_i is a depth of field of the ith pixel unit, and Depth is a foreground depth of field.

6. The method according to claim 1, wherein the preset target area is set by:
   determining, by the terminal upon receiving an instruction for focusing, the preset target area according to a size and coordinates of the preset target area included in the instruction for focusing; or
   determining, by the terminal, the preset target area according to a size and coordinates of the preset target area that are set by default.

7. A mobile device, comprising a primary camera module, a secondary camera module, a memory having instructions stored thereon and a processor in communication with the primary camera module, the secondary camera module and the memory, which is configured to execute the instructions to:
   synchronously obtain preview images of a current scene captured from different angles by a primary camera module and a secondary camera module operating in a dual-camera photographing preview mode;
   calculate, a depth of field of each pixel unit comprised in the preview images based on a phase difference occurring based on a distance and an angle between the primary camera module and the secondary camera module;
obtain a foreground depth of field of a preset target area in a preview image included in the preview images;
determine an area comprising all pixel units having a depth of field beyond a range as a background area;
perform blurring processing on the background area by using a preset blur coefficient;
control output of an image comprising the preset target area and a blurring-processed background area as a real-time preview image of the current scene; and
wherein the pixel unit is one of a pixel or a pixel block comprising a plurality of pixels.

8. The mobile device according to claim 7, wherein the processor is configured to execute the instructions to synchronously obtain preview images of a current scene captured from different angles by a primary camera module and a secondary camera module by:
obtaining original images of the current scene from two different angles captured by a primary camera module and a secondary camera module; and
performing image compression and differential processing on the original images based on a preset zoom ratio and differential coefficient, to obtain preview images of a same size.

9. The mobile device according to claim 8, the processor is further configured to execute the instructions to:
after outputting the real-time preview image, obtain the original images of the current scene upon receiving an instruction for taking a photograph; and
determine, based on the background area determined in the preview image, a corresponding background area in an obtained original image;
perform blurring processing on the background area in the original image by using the preset blur coefficient; and
wherein the processor is further configured to output a modified image comprising a target area in the original image and the background area which has been processed by the blurring processing in the original image as a photographed image.

10. The mobile device according to claim 7, the processor is configured to execute the instructions to perform blurring processing on the background area by using a preset blur coefficient by:
calculating a difference between a depth of field and a foreground depth of field of each pixel unit comprised in the background area, and determining a blur coefficient corresponding to the difference from a pre-defined blur coefficient correspondence; and
performing blurring processing on a corresponding pixel unit by using the determined blur coefficient.

11. The mobile device according to claim 10, wherein the processor is configured to execute the instructions to determine a blur coefficient corresponding to the difference by:
calculating, according to a formula a blur coefficient for each pixel unit comprised in the background area, wherein the formula is $m_i = m \times f(\Delta d)$; and
wherein $m_i$ is a blur coefficient of an ith pixel unit, m is a preset blur coefficient, $f(\Delta d)$ is a monotonically decreasing function or a monotonically increasing function, and $\Delta d = |Depth\_i - Depth|$, $Depth\_i$ is a depth of field of the ith pixel unit, and Depth is the foreground depth of field.

12. The mobile device according to claim 7, the processor is further configured to execute the instructions to:

determine, upon receiving an instruction for focusing, the preset target area according to a size and coordinates of the preset target area included in the instruction for focusing; or
determine the preset target area according to a size and coordinates of the preset target area that are set by default.

13. A non-transitory storage medium configured to store processor-executable instructions that, when executed by a processor, cause the processor to:
synchronously obtain preview images of a current scene captured from different angles by a primary camera module and a secondary camera module operating in a dual-camera photographing preview mode;
calculate, a depth of field of each pixel unit comprised in the preview images based on a phase difference occurring based on a distance and an angle between the primary camera module and the secondary camera module;
obtain a foreground depth of field of a preset target area in a preview image included in the preview images;
determine an area comprising all pixel units having a depth of field beyond a range as a background area;
perform blurring processing on the background area by using a preset blur coefficient;
control output of an image comprising the preset target area and a blurring-processed background area as a real-time preview image of the current scene; and
wherein the pixel unit is one of a pixel or a pixel block comprising a plurality of pixels.

14. The non-transitory storage medium according to claim 13, wherein the processor-executable instructions, when executed by the processor, cause the processor to synchronously obtain the preview images of the current scene by:
synchronously obtaining original images of the current scene from two different angles captured by the primary camera module and secondary camera module respectively; and
performing image compression and differential processing on the original images based on a preset zoom ratio and differential coefficient, to obtain the preview images of a same size.

15. The non-transitory storage medium according to claim 14, wherein the processor-executable instructions, when executed by the processor after outputting the real-time preview image, further cause the processor to:
obtain the original images of the current scene upon receiving an instruction for taking a photograph;
determine a corresponding background area in an obtained original image;
perform blurring processing on the background area in the original image by using the preset blur coefficient; and
output a modified image comprising a target area in the original image and the background area in the original image which has been processed by the blurring processing as a photographed image.

16. The non-transitory storage medium according to claim 13, wherein the processor-executable instructions, when executed by the processor, cause the processor to perform the blurring processing on the background area by:
calculating a difference between a depth of field and a foreground depth of field of each pixel unit comprised in the background area, and determining a blur coefficient corresponding to the difference from a pre-defined blur coefficient correspondence; and
performing blurring processing on a corresponding pixel unit by using the determined blur coefficient.

17. The non-transitory storage medium according to claim 16, wherein the processor-executable instructions, when executed by the processor, cause the processor to determine the blur coefficient corresponding to the difference by:
- calculating, according to a formula, a blur coefficient for each pixel unit comprised in the background area, wherein the formula is $m_i = m \times f(\Delta d)$; and
- wherein, $m_i$ is the blur coefficient of an ith pixel unit, m is a preset blur coefficient, $f(\Delta d)$ is a monotonically decreasing function or a monotonically increasing function, $\Delta d = |Depth\_i - Depth|$, Depth_i is a depth of field of the ith pixel unit, and Depth is a foreground depth of field.

18. The non-transitory storage medium according to claim 13, wherein the processor-executable instructions, when executed by the processor, further cause the processor to set the preset target area by:
- determining the preset target area according to a size and coordinates of the preset target area included in the instruction for focusing; or
- determining the preset target area according to a size and coordinates of the preset target area that are set by default.

\* \* \* \* \*